United States Patent
Jamieson et al.

(10) Patent No.: US 7,275,259 B2
(45) Date of Patent: Sep. 25, 2007

(54) SYSTEM AND METHOD FOR UNIFIED SIGN-ON

(75) Inventors: Steve Jamieson, Bellevue, WA (US); Anil Balakrishnan, Sammamish, WA (US); Christopher Robert Houser, Woodinville, WA (US); Rex George Torres, Snohomish, WA (US); Joseph W. Sharp, Sammamish, WA (US); Guy Paul Larsen, Sannamish, WA (US); Douglas R. Carrell, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 749 days.

(21) Appl. No.: 10/463,911

(22) Filed: Jun. 18, 2003

(65) Prior Publication Data

US 2004/0260942 A1   Dec. 23, 2004

(51) Int. Cl.
  *H04L 9/32*       (2006.01)
  *G06F 15/16*      (2006.01)
(52) U.S. Cl. .................... 726/8; 726/9; 726/10
(58) Field of Classification Search .............. None
  See application file for complete search history.

(56) References Cited

U.S. PATENT DOCUMENTS

| 5,604,490 | A |   | 2/1997  | Blakley, III et al. .... 340/825.31 |
| 5,611,048 | A |   | 3/1997  | Jacobs et al. ........... 395/200.09 |
| 5,655,077 | A |   | 8/1997  | Jones et al. ............ 395/187.01 |
| 5,689,638 | A |   | 11/1997 | Sadovsky .............. 395/188.01 |
| 5,719,941 | A |   | 2/1998  | Swift et al. .................... 380/25 |
| 5,764,890 | A |   | 6/1998  | Glasser et al. ......... 395/188.01 |
| 5,768,504 | A |   | 6/1998  | Kells et al. ............ 395/187.01 |
| 5,797,030 | A |   | 8/1998  | Hoaby ........................ 395/827 |
| 5,908,469 | A |   | 6/1999  | Botz et al. .................. 713/201 |
| 5,944,824 | A | * | 8/1999  | He ................................ 726/6 |
| 6,006,334 | A |   | 12/1999 | Nguyen et al. ............. 713/202 |
| 6,154,843 | A |   | 11/2000 | Hart, Jr. et al. ............. 713/201 |
| 6,178,511 | B1 | * | 1/2001 | Cohen et al. .................. 726/6 |

(Continued)

FOREIGN PATENT DOCUMENTS

WO   WO 2004/006499 A1 *  1/2004

OTHER PUBLICATIONS

Asaravala, A., "A Question of Identity, Passport, Liberty, and the Single Sing-On Race", *New Architect*, 2003, 8(1), 4 pages.

(Continued)

*Primary Examiner*—Christopher Revak
(74) *Attorney, Agent, or Firm*—Woodcock Washburn LLP (57) ABSTRACT

A system that allows a user of a first domain to access a second domain. A request originates in the first domain to perform an action in the second domain. The request indicates a user of the first domain on whose behalf the request was originated. The access request is received by an adapter in the second domain. The adapter requests an access token for a user of the second domain who corresponds to the user of the first domain. A mapping table is used to identify which user in the second domain corresponds to the user in the first domain. Once the correct user of the second domain is identified, an access token for that user is returned to the adapter. The adapter then carries out the requested action by using the access token to impersonate the user of the second domain.

25 Claims, 5 Drawing Sheets

U.S. PATENT DOCUMENTS

| | | | |
|---|---|---|---|
| 6,223,292 B1 | 4/2001 | Dean et al. | 713/202 |
| 6,243,816 B1 | 6/2001 | Fang et al. | 713/202 |
| 6,275,944 B1 | 8/2001 | Kao et al. | 713/202 |
| 6,308,273 B1* | 10/2001 | Goertzel et al. | 726/9 |
| 6,311,275 B1* | 10/2001 | Jin et al. | 726/12 |
| 6,377,994 B1 | 4/2002 | Ault et al. | 709/229 |
| 6,389,543 B1 | 5/2002 | Dawson et al. | 713/202 |
| 6,442,695 B1 | 8/2002 | Dutcher et al. | 713/201 |
| 6,643,782 B1* | 11/2003 | Jin et al. | 726/3 |
| 6,892,307 B1* | 5/2005 | Wood et al. | 726/8 |
| 6,966,004 B1* | 11/2005 | Jin et al. | 726/5 |
| 6,986,038 B1* | 1/2006 | Leah et al. | 713/155 |
| 6,986,039 B1* | 1/2006 | Leah et al. | 713/155 |
| 7,010,600 B1 | 3/2006 | Prasad et al. | 709/225 |
| 7,039,714 B1* | 5/2006 | Blakley III et al. | 709/229 |
| 7,194,764 B2* | 3/2007 | Martherus et al. | 726/8 |
| 2003/0023880 A1* | 1/2003 | Edwards et al. | 713/201 |
| 2003/0037131 A1* | 2/2003 | Verma | 709/223 |
| 2003/0120948 A1* | 6/2003 | Schmidt et al. | 713/200 |
| 2003/0177388 A1* | 9/2003 | Botz et al. | 713/201 |
| 2004/0088543 A1* | 5/2004 | Garg et al. | 713/157 |
| 2004/0260953 A1* | 12/2004 | Jamieson et al. | 713/202 |
| 2005/0108020 A1* | 5/2005 | Lehavi | 705/1 |
| 2005/0204148 A1* | 9/2005 | Mayo et al. | 713/185 |
| 2007/0107048 A1* | 5/2007 | Halls et al. | 726/4 |

OTHER PUBLICATIONS

Chinitz, J., "Single Sign-On: Is It Really Possible?", *Information Systems Security*, 2000, 9(3), 32-45.

Kilgallen, L.J., "The Hazards of Single Sign-On", *Computer Security Journal*, 1994, 10(1), 1-9.

Kornievskaia, O., et al. "Kerberized Credential Translation: A Solution to Web Access Control", *Proceedings of the 10th USENIX Security Symposium*, 2001, 235-249.

Mouly, D., "Single Sign-On: Disspelling the Myths", *Network Computing*, 2001, 11(1), 28-29.

Volchkov, A., "Revisiting Single Sign-On, A Pragmatic Approach in an New Context", *IT Professional*, 2001, 3(1), 39-45.

* cited by examiner

| NTD | NTU | XA | XU |
|---|---|---|---|
| Redmond | henry | Payroll_system | HSMITH |
| Redmond | james | Payroll_system | JJONES |
| Redmond | james | IBM | JJ |
| . | . | . | . |
| . | . | . | . |
| . | . | . | . |

| NTD | NTU | NTP |
|---|---|---|
| Redmond | henry | 'dog' |
| Redmond | james | 'cat' |
| . | . | . |
| . | . | . |
| . | . | . |

SYSTEM AND METHOD FOR UNIFIED SIGN-ON

FIELD OF THE INVENTION

The present invention relates generally to the field of distributed computing. More particularly, the invention provides a mechanism whereby a user who has signed on in a first domain may sign on to a second domain without having to manually enter sign-on credentials in the second domain.

BACKGROUND OF THE INVENTION

In a distributed computing environment, resources or services that a user needs to access may be spread out across different computers. As one example, each employee in an enterprise may have a desktop or laptop computer, which accesses files stored in a central cluster of file servers. Each of these various computers may be controlled by a sign on procedure that requires presentation of credentials. For example, the user may have to enter a valid userID/password combination in order to gain access to the computer. Typically, once a user is signed onto his or her desktop or laptop, he or she does not have to enter a userID/password combination again in order to access the file server, because the file server and the user's computer are part of the same domain.

However, in some cases a user may be working in a first domain (e.g., a cluster of computers based on the UNIX operating system), and may need to access information in a second domain of a different type (e.g., an environment based on the MICROSOFT WINDOWS operating systems). The second domain may maintain its own userIDs and passwords, and may require that the user sign-on to the second domain separately. Conventionally, when the user attempts to access the second domain, the second domain will present the user with a prompt to enter a userID and password for the second domain, which is clearly an inconvenience to the user. It is desirable to allow the user to access the second domain seamlessly—i.e., given that the user has signed onto the first domain, it is desirable to allow the user to access resources and services under his corresponding userID in the second domain, without having to manually enter the userID/password combination for the second domain.

It is possible to automate the process of signing a user of the first domain onto the second domain. Thus, when a user in the first domain needs to access the second domain, a software component can tender the user's userID and password on his behalf without the user's involvement, thereby making it appear to the user as if he has seamlessly accessed the second domain. However, there are some circumstances in which it is not feasible to automate the tendering of the userID and password—e.g., where the first domain does not have access to the second domain's password list.

In view of the foregoing, there is a need for a system and method that overcome the drawbacks of the prior art.

SUMMARY OF THE INVENTION

The present invention provides a mechanism whereby a user who has signed onto a first domain can gain access to a second domain without having to explicitly tender his credentials. For example, the first domain may be an environment based on the UNIX operating system, and the second domain may be an environment based on the MICROSOFT WINDOWS operating systems. A user may be using the first domain, and may need to access a resource or service in the second domain. In order to use the second domain, the user typically needs to have an persona (e.g., userID) with the second domain. In accordance with the invention, the user may register a mapping between his persona in the first domain and his persona in the second domain. Then, when the user attempts to access a resource or service in the second domain, the resource or service can be accessed on the user's behalf, under the identity of the user's persona in the second domain. This access may take place without the user of the first domain having to tender a userID/password combination to the second domain, thus making it appear to the user as if he can seamlessly access the second domain merely by virtue of having signed on to the first domain. A mechanism that permits such access to the second domain is referred to herein as a single sign-on ("SSO") system.

An SSO system in accordance with the invention operates in the second domain, and allows requests by a user in the first domain to be carried out on that user's behalf in the second domain. For example a user may be using a client application (e.g., an accounting application) in the first domain, and may need to perform an action in the second domain (e.g., looking up information stored in an SQL database that is maintained by a database management system in the second domain). When the client application attempts to contact the second domain, the request is received by an adapter in the second domain. The adapter is a software component that runs in the second domain and provides an interface between the first and second domains. The adapter receives the userID of the requesting user from the first domain, and contacts a service of the SSO system to look up that user's corresponding userID for the second domain. A database stores a mapping between userIDs in the first domain and userIDs in the second domain, so the SSO service is able to look up that corresponding userID. The SSO system then returns an access token to the adapter which specifies the user of the second domain whose userID has been looked up by the SSO service. The access token entitles the adapter to run a thread under the userID named therein. Typically, the adapter is running under a special userID that is reserved for the purpose of running adapters. However, the access token preferably enables the adapter to "impersonate" the userID specified in the access token, and to run a thread under that specified userID.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

When a user accesses various different computers in a single domain, the user signs on to a computer once and will then be recognized by other computers in the domain without having to sign on again. However, in many cases, a user may be working in one domain and need to access another domain, thereby requiring that the user enter a userID and password in the other domain. The present invention provides a mechanism whereby a user in a first domain may access a resource or service in a second domain without having to manually tender his credentials (e.g., userID and password) to the second domain. The mechanism of the present invention provides such access even if passwords for the second domain are not available to the first domain.

Exemplary Computing Environment

Figure 1:
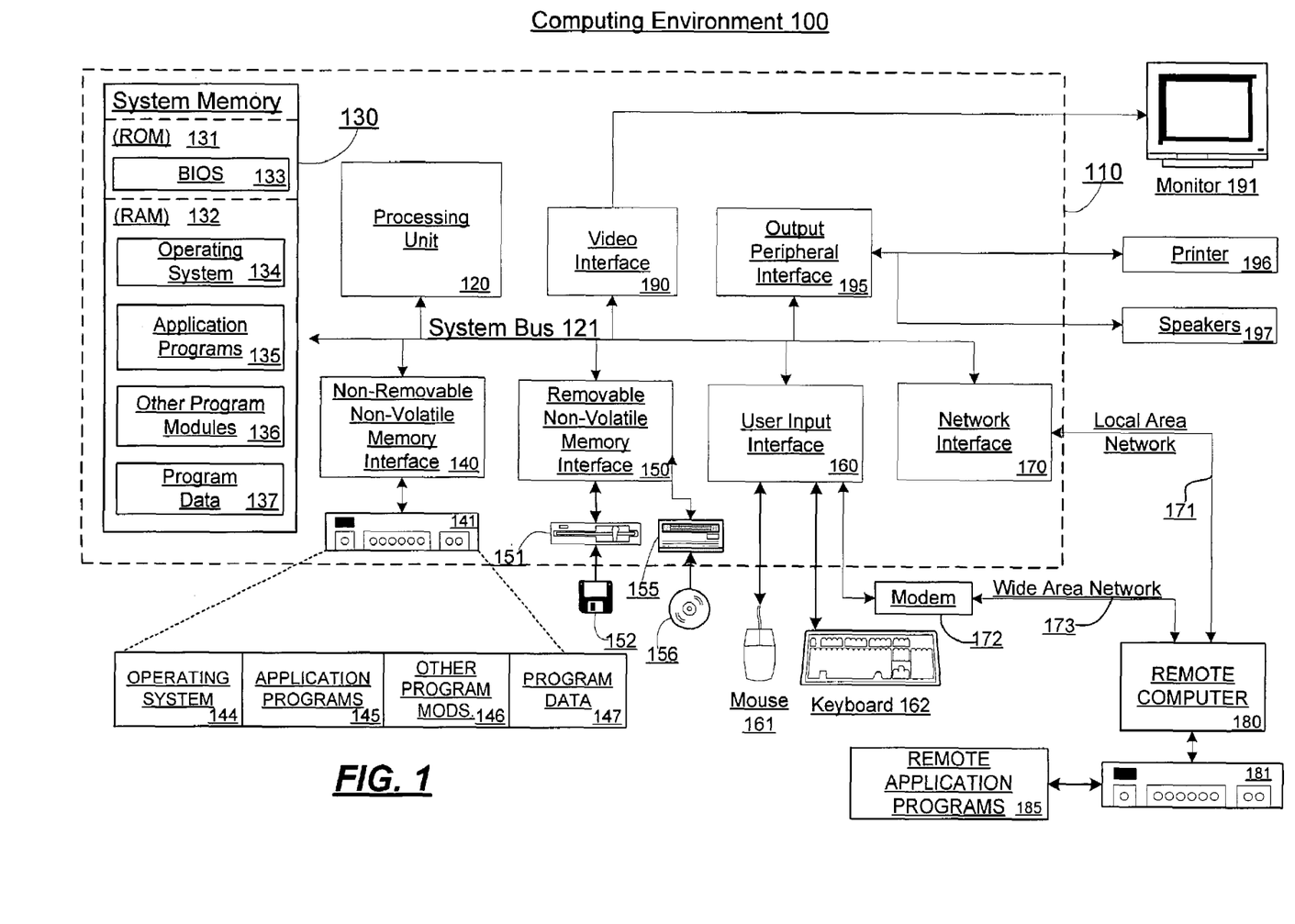
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Multi-Domain Heterogeneous Computing Environments

Figure 2:
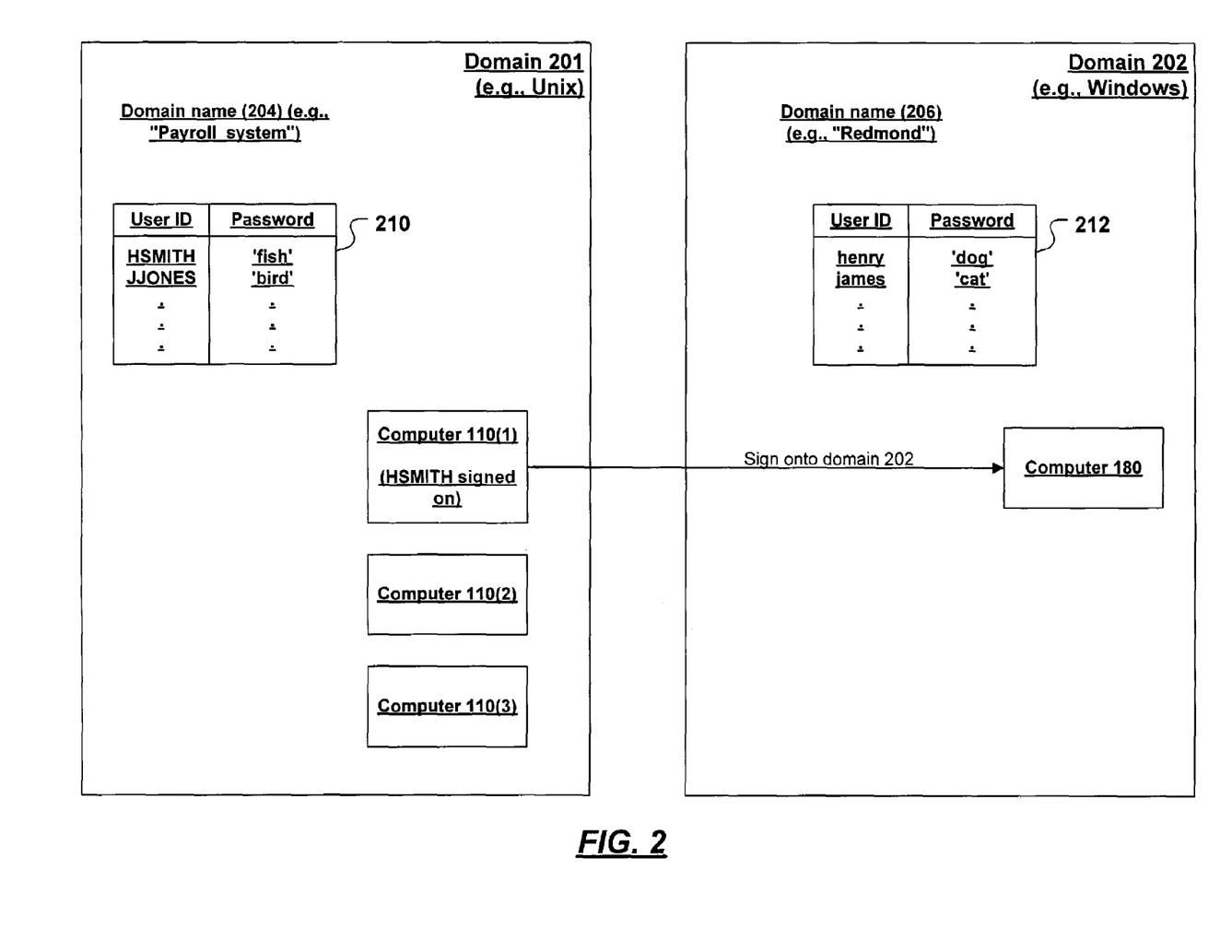
FIG. 2 is a block diagram of an environment in which a user who is signed onto a first domain may access a resource or service in a second domain.

The invention addresses the situation in which a user, who is signed on in one domain, may need to access another domain, access to which is conditioned upon a set of sign-on credential. For example, the domains may be different types of computing environments that have incompatible password systems—e.g., one domain maybe based on the MICROSOFT WINDOWS operating systems, and the other domain may based on the UNIX operating system. Environments of different types may be referred to as "heterogeneous." When a user is working in one domain, it may be necessary for the user to access resources or services that are located in another domain. FIG. 2 shows an exemplary environment in which this situation may occur.

FIG. 2 shows domains 201 and 202. Each of the domains typically has a name 204 and 206 associated therewith. Thus, in this example, domain 201 has the name "Payroll System," and domain 202 has the name "Redmond." (It will be noted that domain names can be assigned in any manner—e.g., by geography, by function, by department within an organization, etc. The domain name is merely for identification.) Each of the domains is a computing environment in which some set of resources (e.g., files, applications, services, etc.) may be available to users who have valid credentials for the domain. In this example, computers 110(1), 110(2), and 110(3) participate in domain 201. A user may login (or "sign on") to a computer as a particular user, thereby gaining access to all of the resources in domain 201 to which that particular user is entitled. In the example of FIG. 2, a user named "HSMITH" is signed onto computer 110(1). There may be certain resources in domain 201 to which any logged-in user is entitled, and there may be other resources to which access is granted or denied based on which user is requesting access. By signing on as "HSMITH," the user of computer 110(1) gains access to all resources in domain 201 that are generally available to users of domain 201, and also to the specific resources that "HSMITH" is permitted to access.

Access to domain 201 (and to the resources that a particular user is permitted to access within that domain) is controlled by "credentials." In the example of FIG. 2, the credentials are a user identifier ("userID") and password combination. At the initiation of a session in domain 201, the user is asked to present a valid userID and password combination. If a valid combination is presented, then the user gains access; if a valid combination is not presented, then the user does not gain access.

The set of valid credentials is maintained in a credential record 210. In the example of FIG. 2, credential record 210 is a table that correlates each known userID with it's correct password. Credential record 210 shows that "HSMITH" and "JJONES" are valid userIDs for domain 201, with passwords "fish" and "bird," respectively. It should be understood that credential record 210 is merely exemplary, and a variety of other types of credential records are possible. For example, as an alternative to storing the actual password for a given userID, credential record 210 could store a hash of the password, a reference to a password stored elsewhere, or any other type of information that can be used to determine whether a userID/passwords combination is valid.

A user within domain 201 may need to access a computer in a separate domain 202. For example, computer 180 may participate in domain 202, and a user who is signed onto domain 201 may need to access a service provided by computer 180. Domain 202 maintains its own credential record 212, which is different from credential record 210. Thus, a userID/password combination that is valid in domain 201 may not be valid in domain 202. In this example, credential record 212 does not list "HSMITH" and "JJONES" as valid users, but does list "henry" and "james" as valid users.

It may be the case that a given person has a set of valid credentials in both domains 201 and 202. For example, a person named "Henry Smith" may have the userID "HSMITH" in domain 201, and "henry" in domain 202. Moreover, there may be some services that Henry Smith needs to access in domain 202 while working in domain 201. Thus, Henry Smith, while signed on as "HSMITH" in domain 201 may use remote communications software to access domain 202 (e.g., by connecting to computer 180), and may then use his valid credentials in domain 202 to gain access to those services. Conventionally, when Henry Smith contacts a computer in domain 202, he will be prompted to enter his userID/password combination, at which time Henry Smith would enter "henry" as the userID and "dog" as the password. However, it may also be the case that a software component running in domain 201 is aware that "HSMITH" has a corresponding account in domain 202, and, when "HSMITH" needs to access domain 202, the software component can tender the userID/password combination henry/dog on his behalf.

Figure 3:
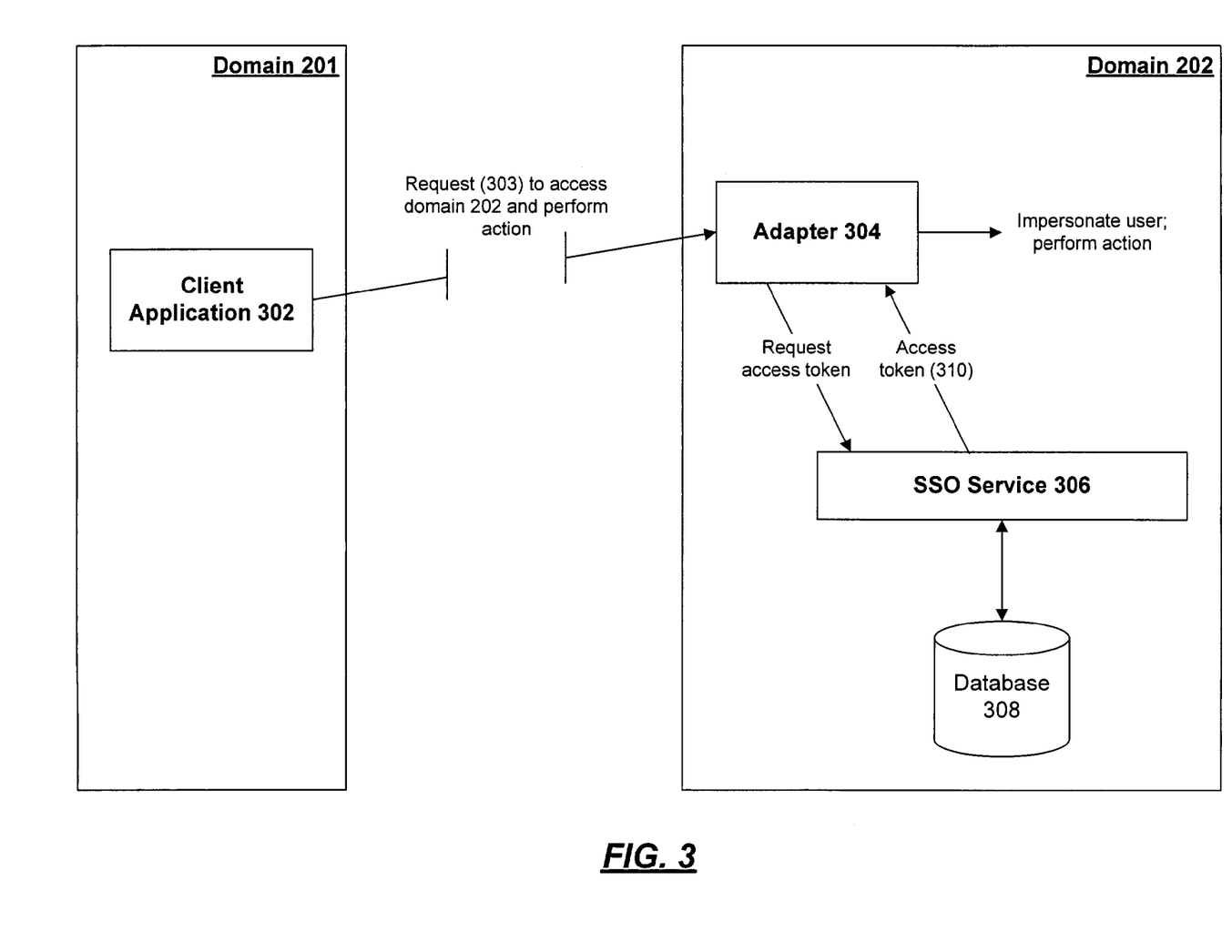
FIG. 3 is a block diagram of an exemplary architecture that supports the use of resources or services in a second domain by a user of a first domain.

As noted above, one way to for HSMITH to access domain 202 is to use communication software to contact a computer in domain 202, and sign onto domain 202 by tendering his userID/password. However, the invention provides a mechanism whereby a user in domain 201 may access domain 202 without having to tender his credentials to domain 202. FIG. 3 shows an architecture in which this type of access may occur.

In the example of FIG. 3, a user in domain 201 (e.g., "HSMITH") is using an application, such as client application 302. At some point during the operation of client application 302, a request 303 to access domain 202 (and to perform operations with their corresponding credentials in domain 202) is generated from client 302. For example, domain 202 may maintain a SQL database that stores records that are needed by client application 302. The request 303 to access domain 202 preferably specifies an action that the user of domain 201 would like to have performed in domain 202 (e.g., a lookup in an SQL database maintained by a database management system in domain 202).

The request 303 to access domain 202 is received by adapter 304. The broken line between client application 302 and adapter 304 indicates that one or more components (not shown in FIG. 3) may, optionally, participate in the path from client 302 to adapter 304. Adapter 304 is a software component that operates in domain 202.

When adapter 304 receives request 303, adapter 304 in turn requests an access token from an SSO service 306. SSO service 306 is a software component that operates in domain 202, and is preferably a service of an operating system that runs in domain 202. For example, in the case where domain 202 is an environment based on the MICROSOFT WINDOWS NT operating system, or a successor to the WINDOWS NT operating system such as WINDOWS 2000 or WINDOWS XP, SSO service 306 may be implemented as an NT service. In general, SSO service 306 exposes functionality that supports the process of accessing domain 202. For example, SSO service 306 may expose to adapter 304 an Application Programming Interface (API) that allows adapter 304 to request access tokens.

Given that request 303 originated with a user in domain 201 named HSMITH, SSO service 306 consults database 308 in order to look up the identity of a user in domain 202 who corresponds to HSMITH. Database 308 stores tables that, among other things, correlate users of various domains. An exemplary structure for a table stored in database 308 is described below in connection with FIG. 4. In this example, "henry" is the user in domain 202 who corresponds to "HSMITH" in 201 (e.g., "henry" and "HSMITH" may be different account names for the same person, Henry Smith). It should be noted that SSO service 306 may not directly expose database 308 to the application level, but may expose APIs that allow applications to use and modify the contents of database 308. For example, SSO service 306 may expose an API that allows its caller to correlate a userID in domain 201 with a userID in domain 202; when that API is called, SSO service 306 may update a table in database 308 (e.g., table 401, discussed below in connection with FIG. 4) in order to persist that correlation.

Once SSO service 306 has determined that "henry" is the user in domain 201 who corresponds to the originator of request 303, SSO service 306 returns an access token 310 that will permit adapter 304 to carry out request 303 on "henry's" behalf. Access token 310 is received by adapter 304. SSO service maintains, for each affiliate application, an "application admin" group, consisting of users who are authorized to run the adapter for a particular affiliate application, and also maintains, for each affiliate application, an "application users" group, consisting of users for which mappings exist for a particular affiliate application. Before issuing access token 310, SSO service 306 ensures that the adapter running the access token is running as a user in the application admin group. In order for an access token to be issued, "henry" must be a member of the application users group.

After adapter 304 has received access token 310, adapter 304 uses access token 310 to impersonate the user identified in the access token (e.g., "henry," in this example). Typically adapter 304 is running under a userID that is reserved for running a particular adapter or set of adapters. However, with an appropriate access token, adapter 304 is able to impersonate another user, thereby carrying out an action as if adapter 304 were running as that user. As noted above, request 303 includes a particular type of action (e.g., a lookup in a SQL database) that HSMITH in domain 201 needs to have performed. Adapter 304 carries out the specified action by impersonating the user named in the access token.

Thus, using the architecture of FIG. 3, a user in domain 201 (e.g., HSMITH) is able to have an action performed in domain 202 under his corresponding userID in domain 202, without having to explicitly enter a userID/password combination to sign onto domain 202. It should be noted that, when the architecture of FIG. 3 is used, it may appear to a user of domain 201 as if he is seamlessly able to access domain 202 by virtue of being signed onto domain 201. It should also be noted that the architecture of FIG. 3 permits the user to use domain 202 without the user's actual credentials being visible to the adapter. This design reduces the chance that the SSO system could be used to steal the password.

Exemplary Mapping Table

Figure 4:
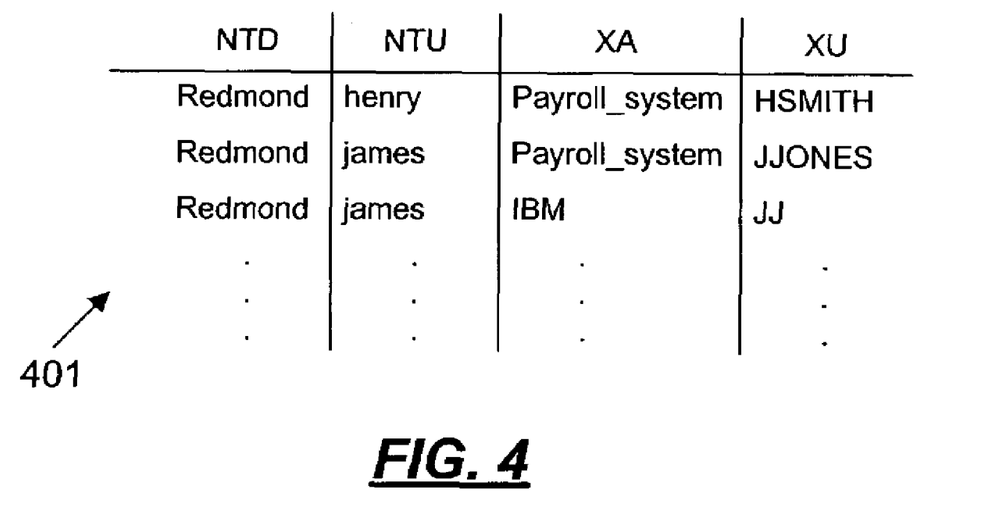
FIG. 4 is a block diagram of an exemplary mapping table.

As described above, database 308 stores one or more tables that represents a mapping between users in domain 201 and users in domain 202. FIG. 4 shows an exemplary structure for such a table.

FIG. 4 shows an exemplary mapping table 401, which correlates users in domain 201 with users in domain 202.

The attributes of the columns are NTD ("NT Domain"), NTU ("NT User"), XA ("External Application"), and XU ("External User"). (The use of "NT" in the first two attributes refers to the fact that the domain 201 in which database 308 is stored is typically a MICROSOFT WINDOWS NT environment, or an environment based on a successor to the WINDOWS NT operating system, such as the WINDOWS 2000 or WINDOWS XP operating systems. However, it will be understood that the invention is not limited to the case where domain 201 is based on the WINDOWS operating system.) Each row of table 401 stores the domain (column NTD) and userID (column NTU) of a user who has a corresponding persona in an "external" domain (e.g., domain 202). For example, there is a row in table 401 where the entries in the NTD and NTU columns are "Redmond," and "henry," respectively, indicating that Redmond/henry has a person in another domain, such as domain 202. Additionally, each row of that table shows the name of the domain in which the user has a corresponding persona (e.g., Payroll_system, in the XA column), and the user's userID in that domain (e.g., HSMITH, in the XU column). (In the last two columns, the "X" stands for "External," referring to the fact that the "other" domain is external to the domain represented by the NTD column; the "A" in column name "XA" is for "application"; in full generality, an external entity, such as domain 202, that may participate in inter-domain access through an SSO system can be referred to as an "external application" or an "affiliate application.") In the example of FIG. 4, table 401 contains a row for the user "henry," indicating that he is in the "Redmond" domain, that he has a corresponding persona in an affiliate application named "Payroll_system" (e.g., domain 202), and that "henry's" corresponding userID in that domain is "HSMITH." Similarly, the user "james" contains an entry indicating that he is in the "Redmond" domain, and that he has the corresponding userID "JJONES" with the "Payroll_system" domain. A user who has corresponding accounts in more than one external or affiliate application may have more than one entry in table 401. For example, "james" may have accounts in both domain 202 (i.e., Payroll_System), and also a different domain or affiliate application (not shown) that may be named IBM. Thus, "james" has a second entry indicating that the domain/user named "Redmond/James" is also associated with the userID "JJ" in an affiliate application named "IBM."

Table 401 may be used to correlate a user in one domain with his credential in another domain. For example, when an adapter in domain 202 receives an access request from a user named "HSMITH" in the domain 201 (i.e., the "Payroll_system" domain), the SSO service can look up the row of table 401 in which Payroll_system and HSMITH appear in the XA and XU columns respectively. The values stored in the NTD and NTU columns then give the domain/userID of the local user (e.g., Redmond/henry) who corresponds to HSMITH.

Figure 4A:
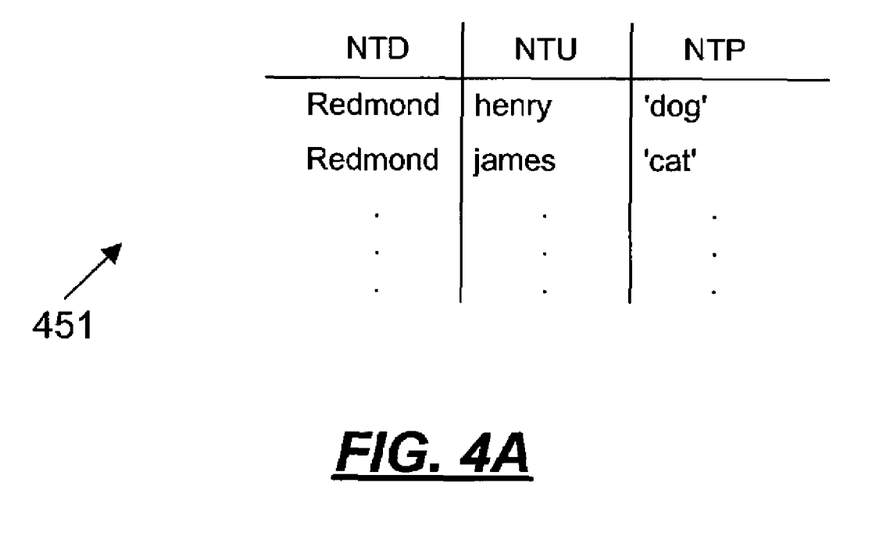
FIG. 4A is a block diagram of an exemplary credentials table.

FIG. 4A shows an exemplary credentials table 451. Table 451 has three columns. The attributes of the columns are NTD, NTU, and NTP. NTD and NTU have the meanings described above, and NTP means "NT password". Thus, table 451 correlates a particular user in a domain (e.g., domain 202) with his password in that domain. Thus, "henry's" password is "dog", and "james's" password is "cat." In the example of FIG. 4A, table 451 shows the same passwords for the users "henry" and "james" as are shown in the credential record 212 for domain 202 (shown in FIG. 2). In essence, table 451 is the SSO system's copy of the userID/passwords for domain 202. In one embodiment, the SSO system may need these passwords in order to obtain an access token. In certain environments, (e.g., WINDOWS SERVER 2003), it is possible to issue an access token without a password, in which case table 451 may not be needed.

Process for Accessing a Second Domain from a First Domain

Figure 5:
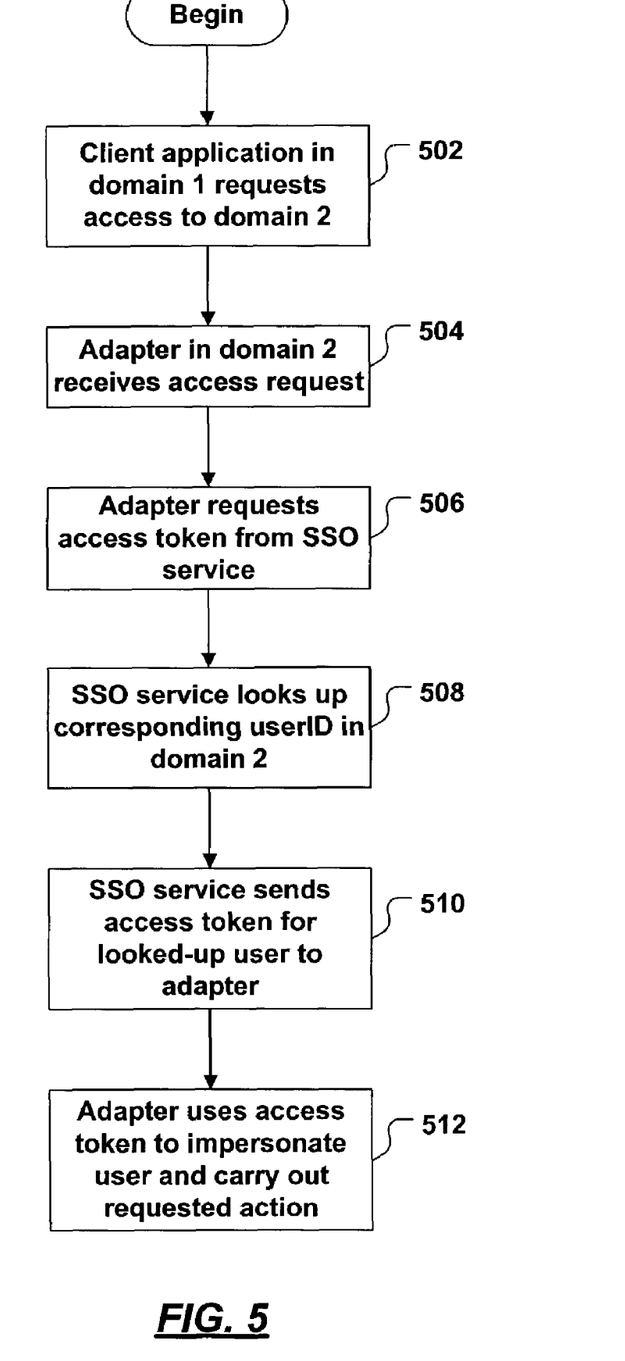
FIG. 5 is an flow diagram of an exemplary process whereby a user signed-onto a first domain may access a resource or service of a second domain in accordance with aspects of the invention.

FIG. 5 shows an exemplary process whereby a user signed-onto a first domain may access a resource or service of a second domain. Initially a user (e.g., HSMITH, in the preceding examples) is signed onto a first domain (referred to in the flowchart of FIG. 5 as "domain 1"). The user may be using a client application in domain 1, and, at some point during the operation of that application, a request to access a second domain ("domain 2") may be generated (step 502). For example, the client application may need to retrieve information from a SQL database that is maintained in domain 2.

After the request to access domain 2 is generated, an adapter in domain 2 receives the request (step 504). As noted above, the request preferably indicates the action that the user of domain 1 wants to perform in domain 2. Upon receiving the request, the adapter contacts an SSO service running in domain 2 in order to request an access token (step 506). As previously noted, the request that the adapter received from domain 1 indicates the identity of the user in domain 1 (e.g., HSMITH) from which the request originated. The SSO service then looks up a domain 2 user (e.g., "henry") who corresponds to the domain 1 user who originated the request (step 508). Typically, a user may have accounts in both domain 1 and domain 2; as previously explained, "HSMITH" and "henry" may account names that are both associated with the same underlying person. As described above in connection with FIG. 4, a database used by the SSO service may store tables that correlate userIDs in one domain with userIDs in another domain, and the SSO service may use such tables to determine which user in domain 2 corresponds to the requesting user in domain 1.

After identifying the user in domain 2 who corresponds to the requesting user from domain 1, the SSO service sends an access token for that user to the adapter (step 510). The adapter then uses the access token to carry out the request while impersonating the user specified in the access token (step 512). As noted above, the adapter typically runs under a userID that is reserved for the running of adapters. However, the adapter can use the access token to impersonate another user. Thus, the adapter can carry out the action specified in HSMITH's request while impersonating the userID "henry." Thus, when the requested action is carried out, the adapter will have access to all of the resources and services to which "henry" would be entitled if "henry" had actually been signed onto domain 202.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method of permitting a first domain to access a second domain comprising:
   receiving, at the second domain, a request from the first domain, the request indicating an action to be performed in the second domain and further indicating a first user in the first domain on whose behalf the action is to be performed;
   looking up a second user in the second domain who corresponds to the first user;
   issuing an access token for the second user; and
   using the access token to perform the action under a persona of the second user,
   wherein the request is received at an adapter that operates in the second domain, the adapter requesting the access token and using the access token to perform said action, and wherein the adapter runs as a third user different from the first user and the second user, wherein the adapter uses the access token to perform said action by impersonating the second user.

2. The method of claim 1, wherein the adapter requests the access token from a service, the service looking up the second user and issuing the access token to the adapter.

3. The method of claim 2, wherein the service operates in the second domain.

4. The method of claim 1, further comprising:
   determining that said third user is a member of an affiliate admin group corresponding to the first domain, members of said affiliate admin group being permitted to obtain access tokens to perform actions on behalf of users in said first domain.

5. The method of claim 1, wherein the act of looking up the second user comprising consulting a database that correlates the first user with the second user.

6. The method of claim 5, wherein the database stores a table that correlates users in the first domain with users in the second domain, there being a row of the table that specifies the first user in a first column and the second user in a second column.

7. The method of claim 1, wherein said third user is reserved for running a set of one or more adapters that includes said adapter.

8. A method of using a first domain to access a second domain comprising:
   generating, in the first domain, a request for a resource or service that is located in the second domain, the request being generated by a process that runs as a first user in the first domain;
   sending the request to the second domain, whereupon the request is carried out in the second domain, by an adapter, on behalf of a second user in the second domain who corresponds to the first user, wherein the adapter runs as a third user different from the first user and the second user, wherein the adapter uses an access token to perform said action by impersonating the second user; and
   receiving a result of the access request from the second domain.

9. The method of claim 8, further comprising:
   establishing a correspondence between the first user and the second user.

10. The method of claim 9, wherein the first user and the second user represent personas in the first domain and second domain, respectively, for the same person.

11. The method of claim 8, wherein the request is made to an adapter that operates in the second domain, and wherein the adapter carries out the request.

12. The method of claim 8, wherein the request is generated by a process that operates in the first domain and passes from the process to the second domain through one or more components of the second domain.

13. The method of claim 8, wherein the second domain comprises a database manager, and wherein the request for a resource or service in the second domain comprises a request to lookup information in the database.

14. The method of claim 8, wherein the second domain stores a password for the second user, and wherein the second domain does not reveal the password to the first domain.

15. The method of claim 8, wherein said third user is reserved for running a set of one or more adapters that includes said adapter.

16. A system that performs actions on behalf of a first domain, the system comprising:
   a service that receives, from a component, a first request for an access token, the first request identifying a first user in the first domain, the service further looking up a second user who corresponds to the first user and issuing to the component the access token, the access token permitting the component to impersonate the second user while carrying out an action,
   wherein the service and the component operate in a second domain different from the first domain, and wherein the second user is a user of the second domain,
   wherein the component comprises an adapter that receives a second request to perform the action, the second request being received by the adapter from the first domain, and wherein the adapter runs in the second domain as a third user, the third user being different from the first user and from the second user.

17. The system of claim 16, wherein the first user and the second user are personas, in the first domain and second domain respectively, for the same person.

18. The system of claim 16, further comprising:
   a database that stores information that correlates the first user with the second user.

19. The system of claim 18, wherein the database stores a table that comprises a plurality of rows, each of the rows comprising:
   a first column that identifies a user in the first domain; and
   a second column that identifies a user in the second domain;
   wherein a first one of the plurality of rows stores the first user in the first column and the second user in the second column.

20. The system of claim 16, wherein said third user is reserved for running a set of one or more adapters that includes said adapter.

21. A computer-readable storage medium having encoded thereon computer-executable instructions to perform acts comprising:
   receiving a first request from a component for an access token;
   looking up, based on a first user of a first domain, a second user of a second domain who corresponds to the first user; and issuing the access token to the component, wherein the access token permits the component to carry out an action by impersonating the second user,
wherein the component comprises an adapter that runs in the second domain as a third user, the third user being different from the first user and the second user.

22. The computer-readable storage medium of claim 21, wherein the act of lookup of a second user comprises:
consulting a database that correlates the first user with the second user.

23. The computer-readable storage medium of claim 22, wherein the database comprises a plurality of rows, each of the rows comprising:
a first column that identifies a user of the first domain; and
a second column that identifies a user of the second domain;
wherein a first one of the plurality of rows stores the first user in the first column and the second user in the second column.

24. The computer-readable storage medium of claim 21, wherein the component receives a second request to perform the action, and wherein the component carries out the action under the persona of the second user by using the access token to impersonate the second user.

25. The computer-readable storage medium of claim 21, wherein said third user is reserved for running a set of one or more adapters that includes said adapter.

* * * * *